US007637815B2

(12) United States Patent
Matsuhara et al.

(10) Patent No.: US 7,637,815 B2
(45) Date of Patent: Dec. 29, 2009

(54) VIDEO GAME PROCESSING APPARATUS, A METHOD AND A COMPUTER PROGRAM PRODUCT FOR PROCESSING A VIDEO GAME

(75) Inventors: Keisuke Matsuhara, Tokyo (JP); Yusuke Matsui, Tokyo (JP); Yoshinori Kitase, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 201 days.

(21) Appl. No.: 11/620,163

(22) Filed: Jan. 5, 2007

(65) Prior Publication Data
US 2007/0173333 A1    Jul. 26, 2007

(30) Foreign Application Priority Data
Jan. 25, 2006  (JP)  ............................. 2006-016424

(51) Int. Cl.
*A63F 13/10* (2006.01)
(52) U.S. Cl. .................. 463/43; 463/42; 273/317.1; 345/619
(58) Field of Classification Search .................. 463/1–5, 463/7–8, 23, 30–34, 36–39, 40–43, 49–57; 345/156, 419, 1.1–3.4, 473–475, 539, 543–544, 345/618–619, 629; 273/148 R, 148 B, 309, 273/317.1, 340, 348, 361–367; 717/168–178; 348/37, 240; 434/115, 117, 211.14; 715/706, 715/738, 757, 762, 764
See application file for complete search history.

(56) References Cited

U.S. PATENT DOCUMENTS 5,864,346 A * 1/1999 Yokoi et al. .................. 345/501

(Continued)

FOREIGN PATENT DOCUMENTS

JP    8-131652    5/1996

(Continued)

OTHER PUBLICATIONS

Devil May Cry, Oct. 17, 2001, Capcom Entertainment, Inc., see full document, see full.*

(Continued)

*Primary Examiner*—Peter DungBa Vo
*Assistant Examiner*—Arthur O. Hall
(74) *Attorney, Agent, or Firm*—Greenblum & Bernstein P.L.C.

(57) ABSTRACT

In a continue screen operation corresponding process, in the case where the player selects to reflect an acquired experiential value to a PC experiential value, a control section of a video game apparatus adds the acquired experiential value to a level-up unused experiential value. Then, in the case where the control section determines that the level-up unused experiential value is an experiential value required for a next level or more, the control section increments a level of a player character, subtracts the experiential value required for a next level from the level-up unused experiential value, and adds the experiential value required for a next level to a level-up used experiential value. The control section then updates an experiential value required for a next level. In the case where the control section determines that the level-up unused experiential value becomes less than the updated experiential value required for a next level, other status of the player character is updated and the processing flow is terminated.

8 Claims, 7 Drawing Sheets

U.S. PATENT DOCUMENTS

| | | | |
|---|---|---|---|
| 5,885,156 | A * | 3/1999 | Toyohara et al. ............... 463/1 |
| 6,213,873 | B1 * | 4/2001 | Gasper et al. ................. 463/14 |
| 6,270,402 | B1 * | 8/2001 | Fujioka et al. ................. 463/2 |
| 6,614,435 | B1 * | 9/2003 | Tsujimoto ................... 345/473 |
| 6,716,102 | B2 * | 4/2004 | Whitten et al. ................ 463/43 |
| 6,736,724 | B1 * | 5/2004 | Erikawa et al. ................ 463/7 |
| 6,743,099 | B2 * | 6/2004 | Yabe et al. .................... 463/36 |
| 7,374,480 | B2 * | 5/2008 | Otani et al. .................... 463/8 |
| 2001/0005689 | A1 * | 6/2001 | Fujioka et al. ................. 463/4 |
| 2001/0009867 | A1 | 7/2001 | Sakaguchi et al. |
| 2002/0142848 | A1 * | 10/2002 | Tsuchida et al. ............. 463/43 |
| 2003/0004000 | A1 * | 1/2003 | Suzuki ........................ 463/43 |
| 2003/0027637 | A1 * | 2/2003 | Sato ............................ 463/42 |
| 2003/0060248 | A1 * | 3/2003 | Yamashita .................... 463/1 |
| 2003/0109297 | A1 * | 6/2003 | Fukutome ...................... 463/7 |
| 2004/0157654 | A1 * | 8/2004 | Kataoka et al. ................ 463/4 |
| 2004/0259613 | A1 * | 12/2004 | Machida ........................ 463/1 |
| 2006/0079324 | A1 * | 4/2006 | Watanabe et al. ............. 463/30 |
| 2006/0111182 | A1 * | 5/2006 | Nakanishi et al. ............. 463/36 |

FOREIGN PATENT DOCUMENTS

JP    2004-243138    9/2004

OTHER PUBLICATIONS

Final Fantasy X-2, Nov. 18, 2003, Square Enix U.S.A., Inc., see full document, see full.*

Street Fighter Alpha 2, Oct. 1, 1996, Capcom Entertainment, Inc. ,see full.*

"SNK Playmore Game Official Site Samurai's Soul-Shimensoka (Embattled)", URL:http://game.snkplaymore.co.jp/mobile/i-mode/special/shimensoka.php, along with a partial English translation thereof.

"Capcom Kanzen Kouryaku Series (26) Biohazard 3 Last Escape Kanzen Kouryaku Guide, the first edition", Capcom Co., Ltd., Jan. 30, 2003, the first edition, pp. 115, 172 to 173, ISBN: 4-575-16368-6.

"Se-Mook Kingdom Hearts Chain of memories Ultimania the first edition", Square Enix Co., Ltd., Jan. 7, 2005, the first edition, pp. 15 to 16, ISBN: 4-7575-1344-5.

* cited by examiner

STATUS SCREEN

LEVEL: 1  ~201

HP: 780 / 780  ~202

Acquired Experiential Value: 80  ~203

Level-Up Unused Experiential value: 0  ~204

Experiential Value Required for Next Level: 20  ~205

Level-Up Used Experiential Value: 0  ~206

Remaining Amount of Money : 500  ~207

NPC BASIC DATA

| Character Name | Maximum HP | Death Experiential Value | Damage Experiential Value |
|---|---|---|---|
| Character Q | 22800 | 20 | 0.07 |
| Character R | 15000 | 10 | 0.03 |
| Character S | 500 | 5 | 0 |
| ⋮ | ⋮ | ⋮ | ⋮ |

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2006-016424, filed on Jan. 25, 2006, the disclosure of which is expressly incorporated herein by reference in its entirety.

BACKGROUND OF THE INVENTION

1. Field of the Invention

The present invention relates to a technique for controlling progress of a video game by displaying a player character on an image display screen of an image display apparatus, and by controlling an action of the player character displayed on the image display screen in response to operations by a player.

2. Description of the Related Art

Heretofore, various kinds of so-called role playing games (RPG; that is, a game in which a player plays a role of a character in a world of the game, and accomplishes a predetermined object while enjoying a process that the character grows through various experiences) have been provided.

In a RPG, generally, a player character acting in response to operations by the player wins a battle against an enemy character thwarting accomplishment of a predetermined object in the RPG, by which various benefits such as an experiential value are supplied to the player character.

In a video game such as a RPG, in the case where a player selects to continue playing the video game when a player character becomes a battle impossible state and the video game is then over, the video game starts from the nearest save point. For that reason, the player character does not inherit benefits such as an experiential value that the player character has acquired from the nearest save point to the time when the video game is over at the time of "continue", and such benefits lead to disappear.

Heretofore, there is an apparatus that receives a continue operation to continue playing a video game at a different stage whenever any stage in the video game is terminated, and that calculates a total score after termination of the video game to display it (for example, see Japanese Patent Application Publication No. 2004-243138). However, in the invention described in this patent document, a video game does not restart from the nearest save point at the time of "continue" after the video game is over, but the total score is merely displayed when the video game is completed (terminated).

In the case where benefits such as an experiential value that the player character has acquired from the nearest save point to the time when the video game is over are not reflected at the time of "continue", the video game restarts under the same conditions. Thus, it is difficult for, in particular, an inexperienced player (that is, a player who does not have much experience) to make the video game proceed smoothly, and therefore, there was a fear that this causes such a player to lose interest in the video game.

In order to solve this problem, it has been proposed that an experiential value, which the player character has acquired until the time when the video game is over, is caused to be reflected at the time of "continue" (for example, see "SNK PLAYMORE GAME OFFICIAL SITE Samurai's Soul -Shimensoka (Embattled)-", URL: http://www.snkplaymore.jp/game/keitai/i-mode/shimensoka/index.php).

However, in the case where an experiential value that the player character has acquired until the time when the video game is over is caused to be reflected at the time of "continue", it is impossible for a player to restart the video game at the same conditions. This takes a chance from, for example, an experienced player who wants to try the video game again by changing strategy under the same conditions. Therefore, there was a fear that this causes such a player to deteriorate motivation to continue playing the video game.

Namely, in the case where clear of the stage is to be facilitated after restart of the video game by means of simple increase of offensive power due to level up of the player character, there was a fear that the player, who wants to try various kinds of strategy to clear the current stage while keeping the current level of the player character when the video game is over, loses his motivation and desire to continue playing the video game.

SUMMARY OF THE INVENTION

It is one object of the present invention to solve the problems described above and to provide a video game processing apparatus, a method and a computer program product for processing a video game by which it is possible to reflect an experiential value, which a player character has acquired from a nearest save point to the time when a video game is over, at the time of "continue" in accordance with the desire of the player, and it is also possible to improve player's motivation and desire to continue playing the video game regardless of level of skill of the player.

In order to achieve the above object, an aspect of the present invention is directed to a video game processing apparatus. In one embodiment of the present invention, the video game processing apparatus causes an image display apparatus to display a player character of a video game on an image screen of the image display apparatus. In this case, the video game processing apparatus controls progress of the video game by controlling an action of the player character displayed on the image screen in accordance with operations by a player. The video game processing apparatus of the present invention includes a game progress state information memory for storing game progress state information that indicates a progress state of the video game.

The video game processing apparatus also includes a game progress state information update processor that, when a predetermined save execution condition is met, updates the game progress state information stored in the game progress state information memory to allow the player to resume playing the video game from the progress state of the video game indicated by the game progress state information.

The video game processing apparatus also includes an acquired experiential value determiner that determines an experiential value that the player character is caused to acquire in the case where a predetermined condition to acquire the experiential value is met.

The video game processing apparatus also includes an experiential value memory that stores the experiential value determined by the acquired experiential value determiner.

The video game processing apparatus also includes a game continuation determiner that, when the player character becomes a battle impossible state, determines whether or not the video game is to be continued in response to an instruction from the player.

The video game processing apparatus also includes an experiential value reflection receiver that receives from the player whether or not the experiential value stored in the experiential value memory is to be reflected to a level of the player character in the video game in the case where the game continuation determiner determines to continue playing the video game.

The video game processing apparatus also includes an experiential value reflector that reflects the experiential value stored in the experiential value memory to the level of the player character in the video game in the case where the experiential value reflection receiver receives the instruction that the experiential value is to be reflected to the level of the player character in the video game.

The video game processing apparatus also includes a game continuation processor that, when the experiential value reflection receiver receives the instruction that the experiential value is to be reflected to the level of the player character in the video game after the game continuation determiner determined to continue playing the video game, maintains the level of the player character in the video game, to which the experiential value stored in the experiential value memory has been reflected by the experiential value reflector, and causes the video game to proceed to a scene indicated by the game progress state information stored in the game progress state information memory.

Since the video game processing apparatus may have a configuration as described above, it is possible to reflect the experiential value that the player character has acquired from a nearest save point to the time when the video game is over in accordance with the desire of the player at the time of "continue". It is also possible to improve player's motivation and desire to continue playing the video game regardless of level of skill of the player.

It is preferable that the experiential value reflector reflects the experiential value stored in the experiential value memory to the level of the player character in the video game even before the game progress state information is updated after the predetermined save execution condition is met, or even when a stage in the video game is cleared. Since the video game processing apparatus may have a configuration as described above, it is possible to reflect the experiential value that has been acquired from the nearest save point to the level of the player character in the video game at the time of "save" or "stage clear".

It is preferable that the experiential value reflector reflects the experiential value stored in the experiential value memory to the level of the player character in the video game only in the case where the experiential value is a predetermined reference value or more. Since the video game processing apparatus may have a configuration as described above, it is possible to reflect the experiential value to the level of the player character in the video game so long as the experiential value is a predetermined reference value or more.

It is preferable that the video game processing apparatus further includes: a reference value determiner that determines the predetermined reference value used to determine whether or not the experiential value stored in the experiential value memory is to be reflected to the level of the player character in the video game in accordance with at least one of setting contents of the degree of difficulty in the video game and the type of a stage in the video game. Since the video game processing apparatus may have a configuration as described above, it is possible to change the reference value in accordance with the setting contents of the degree of difficulty in the video game or the type of a stage in the video game.

It is preferable that the video game processing apparatus further includes: an experiential value parameter reflector that reflects the experiential value stored in the experiential value memory to a parameter other than the level of the player character in the video game, wherein the experiential value parameter reflector reflects the experiential value to the parameter other than the level of the player character in the case where the experiential value reflection receiver receives the instruction that the experiential value is not to be reflected to the level of the player character in the video game. Since the video game processing apparatus may have a configuration as described above, it is possible to reflect the experiential value to the parameter other than the level of the player character in the video game in accordance with the instruction from the player with respect to a player who wants to clear a stage by trying various kinds of strategy while keeping the level of the player character without facilitating the clear of the stage at the time of "resume (restart)" by means of simple increase of offensive power due to level up of the player character.

It is preferable that the parameter other than the level of the player character in the video game includes a money point that is to be used as money in the video game, and the experiential value parameter reflector converts and reflects the experiential value stored in the experiential value memory to the money point. Since the video game processing apparatus may have a configuration as described above, it is possible to convert and reflect the experiential value to the money point in accordance with the instruction from the player with respect to a player who wants to clear a stage by trying various kinds of strategy while keeping the level of the player character without facilitating the clear of the stage at the time of "resume (restart)" by means of simple increase of offensive power due to level up of the player character.

It is preferable that the predetermined condition to acquire the experiential value is met when a life point (for example, a hit point (HP)) of an enemy character is lowered to a predetermined battle impossible value and the enemy character becomes a battle impossible state or when a battle state with an enemy character whose life point is lowered is terminated due to a predetermined condition such as escape of the enemy character. Since the video game processing apparatus may have a configuration as described above, it is possible to cause the player character to acquire an experiential value even in the case where the player character causes an enemy character to become an action impossible state (for example, a state where the enemy character is dead in the video game).

It is preferable that the predetermined battle impossible value includes: an action impossible value that is set as a value at which the enemy character becomes an action impossible state (for example, the action impossible value is a value of the HP at which the enemy character becomes a dead state in the video game, and is generally set to "0"); and an escape value that is set as a value at which the enemy character starts to escape (for example, the escape value is a value of the HP of the enemy character who tends to stop the battle and escape in the video game).

In another embodiment of the present invention, the video game processing apparatus causes an image display apparatus to display a player character of a video game on an image screen of the image display apparatus. In this case, the video game processing apparatus controls progress of the video game by controlling an action of the player character displayed on the image screen in accordance with operations by a player. The video game processing apparatus of the present invention includes a game progress state information memory for storing game progress state information that indicates a progress state of the video game.

The video game processing apparatus also includes a game progress state information update processor that, when a predetermined save execution condition is met, updates the game progress state information stored in the game progress state information memory to allow the player to resume playing the video game from the progress state of the video game indicated by the game progress state information.

The video game processing apparatus also includes an acquired experiential value determiner that determines an experiential value that the player character is caused to acquire in the case where a predetermined condition to acquire an experiential value is met.

The video game processing apparatus also includes an experiential value reflector that reflects the experiential value to a level of the player character in the video game immediately when the acquired experiential value determiner determines the experiential value.

The video game processing apparatus also includes a game continuation determiner that, when the player character becomes a battle impossible state, determines whether or not the video game is to be continued in response to an instruction from the player.

The video game processing apparatus also includes an experiential value reflection receiver that receives from the player whether to maintain the reflection of the experiential value by the experiential value reflector in the case where the game continuation determiner determines to continue playing the video game.

The video game processing apparatus also includes a game continuation processor that, when the experiential value reflection receiver receives the instruction that the reflection of the experiential value by the experiential value reflector is to be maintained after the game continuation determiner determined to continue playing the video game, maintains the reflection of the experiential value by the experiential value reflector, and causes the video game to proceed to a scene indicated by the game progress state information stored in the game progress state information memory.

Since the video game processing apparatus may have a configuration as described above, it is possible to maintain the level of the player character in the game to which the experiential value that the player character has acquired from a nearest save point to the time when the video game is over is reflected in accordance with the desire of the player at the time of "continue". It is also possible to improve player's motivation and desire to continue playing the video game regardless of level of skill of the player.

Further, according to another aspect of the present invention, the present invention is directed to a method of processing a video game by causing an image display apparatus to display a player character of the video game on an image screen of the image display apparatus. In this case, the method controls progress of the video game by controlling an action of the player character to be displayed on the image screen in accordance with an operation by a player. In one embodiment, The method of the present invention includes updating game progress state information that indicates a progress state of the video game and is stored in a game progress state information memory to allow the player to resume playing the video game from the progress state of the video game indicated by the game progress state information when a predetermined save execution condition is met.

The method also includes determining an experiential value that the player character is caused to acquire in the case where a predetermined condition to acquire the experiential value is met.

The method also includes storing the experiential value thus determined in an experiential value memory.

The method also includes determining whether or not the video game is to be continued in response to an instruction from the player when the player character becomes a battle impossible state.

The method also includes receiving from the player whether or not the experiential value stored in the experiential value memory is to be reflected to a level of the player character in the video game in the case where it is determined to continue playing the video game.

The method also includes reflecting the experiential value stored in the experiential value memory to the level of the player character in the video game in the case where the instruction that the experiential value is to be reflected to the level of the player character in the video game is received.

The method also includes maintaining the level of the player character in the video game, to which the experiential value stored in the experiential value memory has been reflected, when the instruction that the experiential value is to be reflected to the level of the player character in the video game is received after it was determined to continue playing the video game, and causing the video game to proceed to a scene indicated by the game progress state information stored in the game progress state information memory.

In another embodiment, the method of the present invention includes updating game progress state information that indicates a progress state of the video game and is stored in a game progress state information memory to allow the player to resume playing the video game from the progress state of the video game indicated by the game progress state information when a predetermined save execution condition is met.

The method also includes determining an experiential value that the player character is caused to acquire in the case where a predetermined condition to acquire an experiential value is met.

The method also includes reflecting the experiential value to a level of the player character in the video game immediately when the experiential value is determined.

The method also includes determining whether or not the video game is to be continued in response to an instruction from the player when the player character becomes a battle impossible state.

The method also includes receiving from the player whether to maintain the reflection of the experiential value in the case where it is determined to continue playing the video game.

The method also includes maintaining the reflection of the experiential value when the instruction that the reflection of the experiential value is to be maintained is received after it was determined to continue playing the video game, and causing the video game to proceed to a scene indicated by the game progress state information stored in the game progress state information memory.

Moreover, according to still another aspect of the present invention, the present invention is directed to a computer program product for processing a video game. In this case, progress of the video game is controlled by causing an image display apparatus to display a player character of the video game on an image screen of the image display apparatus, and controlling an action of the player character to be displayed on the image screen in accordance with an operation by a player. In one embodiment, the computer program product of the present invention causes a computer (for example, the video game apparatus 100, including the video game apparatus main body 10) to execute steps including updating game progress state information that indicates a progress state of the video game and is stored in a game progress state information memory to allow the player to resume playing the video game from the progress state of the video game indicated by the game progress state information when a predetermined save execution condition is met.

The steps also include determining an experiential value that the player character is caused to acquire in the case where a predetermined condition to acquire the experiential value is met.

The steps also include storing the experiential value thus determined in an experiential value memory.

The steps also include determining whether or not the video game is to be continued in response to an instruction from the player when the player character becomes a battle impossible state.

The steps also include receiving from the player whether or not the experiential value stored in the experiential value memory is to be reflected to a level of the player character in the video game in the case where it is determined to continue playing the video game.

The steps also include reflecting the experiential value stored in the experiential value memory to the level of the player character in the video game in the case where the instruction that the experiential value is to be reflected to the level of the player character in the video game is received.

The steps also include maintaining the level of the player character in the video game, to which the experiential value stored in the experiential value memory has been reflected, when the instruction that the experiential value is to be reflected to the level of the player character in the video game is received after it was determined to continue playing the video game, and causing the video game to proceed to a scene indicated by the game progress state information stored in the game progress state information memory.

In another embodiment, the computer program product of the present invention causes a computer to execute steps including updating game progress state information that indicates a progress state of the video game and is stored in a game progress state information memory to allow the player to resume playing the video game from the progress state of the video game indicated by the game progress state information when a predetermined save execution condition is met.

The steps also include determining an experiential value that the player character is caused to acquire in the case where a predetermined condition to acquire an experiential value is met.

The steps also include reflecting the experiential value to a level of the player character in the video game immediately when the experiential value is determined.

The steps also include determining whether or not the video game is to be continued in response to an instruction from the player when the player character becomes a battle impossible state.

The steps also include receiving from the player whether to maintain the reflection of the experiential value in the case where it is determined to continue playing the video game.

The steps also include maintaining the reflection of the experiential value when the instruction that the reflection of the experiential value is to be maintained is received after it was determined to continue playing the video game, and causing the video game to proceed to a scene indicated by the game progress state information stored in the game progress state information memory.

According to the present invention, it is possible to reflect an experiential value, which a player character has acquired from the nearest save point to the time when the video game is over, to the experiential value of the player character at the time of "continue" in accordance with the desire of a player, and this makes it possible to improve motivation of the player to continue playing the video game regardless of proficiency of the player.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
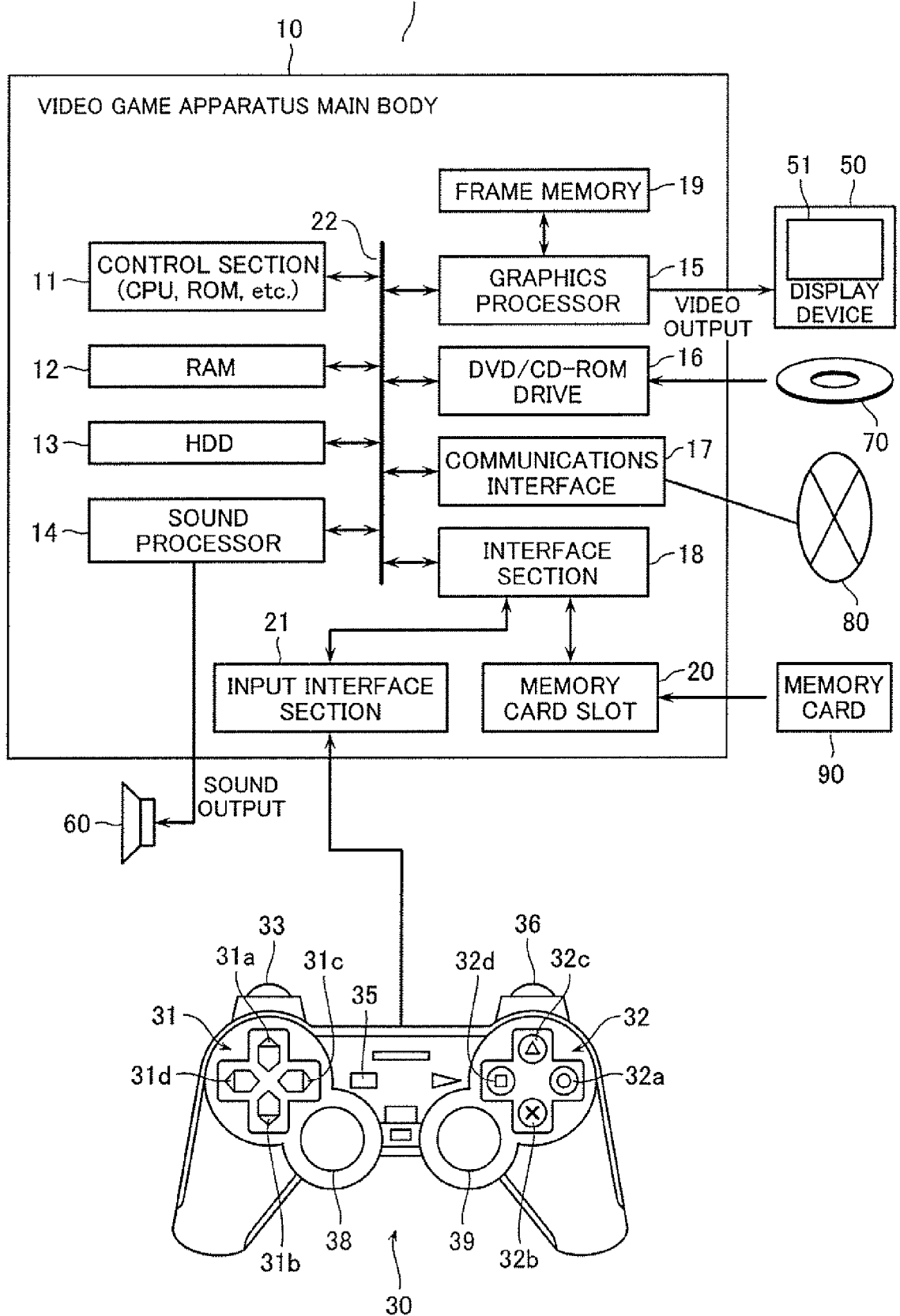
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the invention.

As shown in FIG. 1, a video game apparatus 100 of this embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micromirror device, a holographic display device, or any combination thereof. The display device 50 is provided with an image display screen 51. However, those skilled in the art will readily recognize that any device capable of generating or reproducing an image may be used without departing from the scope or spirit of the invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disc Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like, and carries out control of the whole video game apparatus 100 in accordance with control programs stored in the HDD 13 and/or a storage medium 70. The control section 11 has an internal timer used to generate timer interruption. The RAM 12 is used as a work area for the control section 11. The HDD 13 is a storage region for storing the control programs and various data.

The sound processor 14 is connected to the sound output-device 60, which includes a speaker, for example, but may include any other device capable of generating or reproducing an audible signal. The sound processor 14 outputs a sound signal to the sound output device 60 in accordance with a sound outputting command from the control section 11 that carries out a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the invention. The graphics processor 15 develops an image on the frame memory 19 in accordance with a drawing or graphics from the control section 11, and outputs video signals for displaying the image on the image display screen 51 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 carries out a process for reading out various data such as control programs from the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21 and the memory card slot 20 is connected to the interface section 18. The interface section 18 causes the RAM 12 to store instruction data from the input interface section 21 on the basis of operation(s) of a controller device such as a keypad 30 by a player of the video game apparatus 100. In response to the instruction data stored in the RAM 12, the control section 11 carries out various arithmetic processing.

The video game apparatus main body 10 is connected to the controller device such as a keypad 30 as an operation input section (controller) via the input interface section 21. However, other types of controllers may be used without departing from the scope or spirit of the invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d, and the group of buttons 32 includes a circle button 32a, an X key 32b, a triangle key 32c and a square key 32d. Further, a select button 35 is arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 is provided with multiple switches respectively connected to the cross key 31, the circle button 32a, the X button 32b, the triangle button 32c, the square button 32d, the select button 35, the R1 button 36 and the L1 button 33. When pressing force is applied to any button, the corresponding switch is turned on. A detecting signal in accordance with on/off of the switch is generated in the keypad 30, and detecting signals are generated, respectively, corresponding to inclined directions of the left joystick 38 and the right joystick 39 in the keypad 30.

The two types of detecting signals generated in the keypad 30 are output to the control section 11 via the input interface section 21 (through wired or wireless connection), by which detecting information indicating that button on the keypad 30 is pressed and detecting information indicating the state of each of the left joystick 38 and the right joystick 39 are generated. In this way, operation instruction(s) by a user (player) using the keypad 30, for example, is supplied to the video game apparatus main body 10 (control section 11).

Further, the interface section 18 carries out, according to the command(s) from the control section 11, a process to store data indicative of the progress of the video game stored in the RAM 12 into the memory card 90 installed in the memory card slot 20. The interface section 18 also carries out a process to read out data on the video game stored in the memory card 90 at the time of suspending the video game and to transfer such data to the RAM 12, or the like.

Various data such as control program data for performing the video game with the video game apparatus 100 are stored in, for example, the storage medium 70. The various data such as the control program data stored in the storage medium 70 are read out by the DVD/CD-ROM drive 16 in which the storage medium 70 is installed, and the data thus read out are loaded onto the RAM 12. The control section 11 carries out, in accordance with the control program loaded on the RAM 12, various processes such as a process to output the drawing or graphics to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 carries out processing.

It is assumed that the three-dimensional video game according to the present embodiment is a video game wherein multiple characters, including a player character (that is, a character who moves in accordance with the operation of the keypad 30 by the player), move on a field provided in a virtual three-dimensional space, by which the video game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to the present embodiment will now be described.

Here, in order to simplify the explanation of the operation of the video game apparatus 100, it is assumed that only a single player character and multiple non-player characters (which are moved in accordance with control of the video game apparatus 100 (more specifically, control of the control section 11), and hereinafter, referred to simply as "NPC") exist as objects that are movable in the virtual three-dimensional space. However, the explanation for any process other than the processes relating to the present invention is omitted, in particular. In this regard, in the present embodiment, video game control for a RPG is carried out, but those skilled in the art will recognize and appreciate that changes to the invention can be made without departing from the scope or spirit of the invention.

Figure 2:
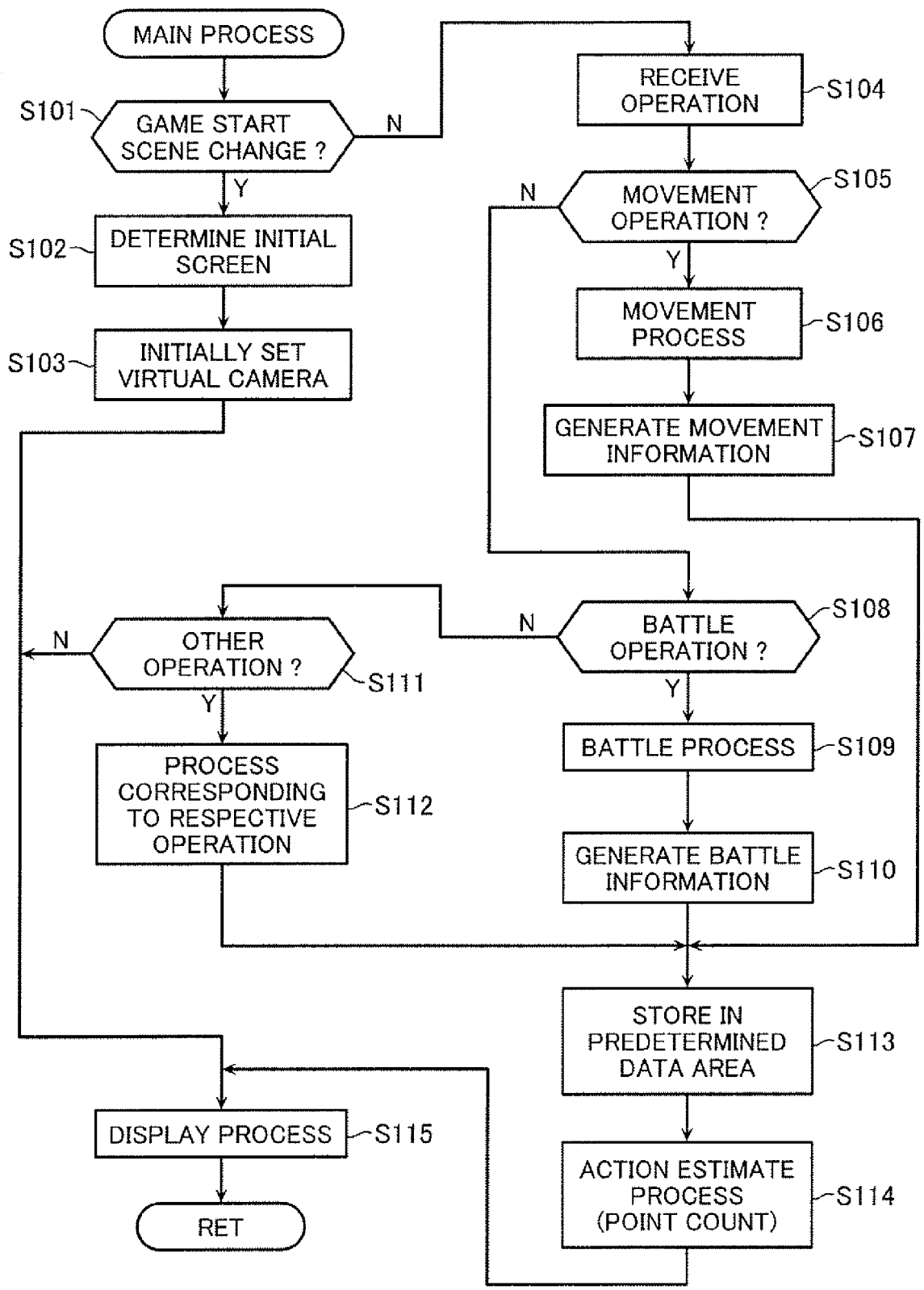
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process is carried out in accordance with timer interruption at every 1/30 second. However, it is to be noted that timing of "at every 1/30 second" is only one example. Instead, for example, the main process may be carried out in accordance with timer interruption at every single field period (every 1/60 second) or at every two frame periods (every 1/15 second), or any other appropriate field rate that may be recognized by those skilled in the art to be appropriate without departing from the scope or spirit of the invention.

In the present embodiment, a video game (that is, a RPG game) proceeds in a common field (that is, a single field where a battle field and a movement field are not distinguished from each other) in which various actions (such as a battle action and/or a movement action) including the movement of the player character and a battle by the player character are allowed. In the case where a predetermined object in the field is accomplished, one stage may be terminated and the processing may proceed to another stage carried out in a next field. Further, in the present embodiment, a same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a video game is generated through an operation of the keypad 30, via manipulation of the controller 30 by the player or not in the case where the state is still before the video game start. Alternatively, once the video game has started or in progress, the control section 11 determines whether a timing state is reached to change the scene (for example, change the field) or not in the case where the state is during execution of the video game (Step S101). The timing state to change the scene is, for example, the time at which a virtual three-dimensional space illustrating a new scene is displayed on the image display screen 51 in order to finish the scene that has been displayed on the image display screen 51 until that point (for example, a scene displayed by a virtual three-dimensional space, and a scene displayed by a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of start of the video game, or an initial screen shown at the time of change in the scene) in accordance with the control program (Step S102). In this case, various data such as image data used for the video game and characters are stored in the storage medium 70. At Step S102, an initial display position of the player character in an initial screen or a scene after a scene change (for example, a new stage in the RPG), a non-player character or non-player characters to be displayed, an initial display position of each of the non-player characters (NPCs) to be displayed and the like are determined in accordance with the control program.

Subsequently, the control section 11 determines a viewpoint position of a virtual camera, a direction of a visual axis, and a size of a visual angle in accordance with the control program. The control section 11 then carries out an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 by the player (Step S104). Namely, the control section 11 determines whether instruction data for executing movement of the player character or the like is inputted from the keypad 30 via the input interface section 21. In the case where effective instruction data (that is, it means that such effective instruction data is instruction data that is allowed to be received by the control section 11) is inputted, the control section 11 receives the effective instruction data.

In the case where the control section 11 receives instruction data for instructing an action of the player character relating to the movement of the player character (that is, movement instruction data: movement instruction by a movement command or the cross key (directional instruction key)) in accordance with the operation of the keypad 30 regarding the movement of the player character (movement operation) at Step S104 ("Yes" at Step S105), the control section 11 executes a movement process in accordance with the movement instruction data thus received (Step S106). In the movement process, the control section 11 moves the position of the player character in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is in a melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, and data on the size of a visual angle, and changes the setting content of the virtual camera. The movement information includes various kinds of information on the movement such as the viewpoint position of the virtual camera, the direction of the visual axis, and the size of the visual angle changed along with the position of the player character after the movement and the movement of the player character. Then, the processing flow proceeds to Step S113.

In the case where the control section 11 receives instruction data for instructing an action for the player character regarding a battle (that is, battle instructing data: a battle command) in accordance with the operation of the keypad 30 by the player for instructing the action of the player character regarding a battle (a battle operation) at Step S104 ("Yes" at Step S108), the control section 11 executes a battle process in accordance with the received battle instructing data (Step S109). In the battle process, the control section 11 executes, for example, a process to determine a battle result and/or battle development between an enemy character to be a non-player character to battle against and the player character, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character who battles an enemy character in the battle process, the name of the enemy character, battle development information, battle result information, a parameter (or parameters) that defines the ability (or abilities) of the player character, and the like. The battle information includes various kinds of information on the battle such as the name of the player character who battles an enemy character, the name of the enemy character, battle development, battle result thereof, and a parameter that defines the ability of the player character. Then, the processing flow proceeds to Step S113.

In the case where the control section 11 receives instruction data for other instructions (that is, other instruction data other than local or normal action instruction data, an other command) in accordance with the operation of the keypad 30 for executing other instruction (other operation) at Step S104 ("No" at Step S105, "No" at Step S108, and "Yes" at Step S111), the control section 11 executes a process (for example, a conversation between characters, a purchase action, a pick up action, and the like) in accordance with the other instruction data thus received (Step S112). The other information corresponding to the process result at Step S112 is then generated, and the processing flow proceeds to Step S113.

The control section 11 updates the current position of the player character by storing the movement information generated at Step S107 in a predetermined data area of the RAM 12 at Step S113. Further, the control section 11 memorizes and stores various action histories of the player character by storing the battle information generated at Step S110 and the other information generated after Step S112 in a predetermined data area of the RAM 12 at Step S113.

Subsequently, the control section 11 executes an action estimate process on the basis of information indicating the action histories of the player character once stored in the RAM 12 (Step S114). More specifically, information required to be digitized is digitized using conversion tables prepared in advance, and with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area, by which the score is updated as estimate information.

Then, the control section 11 perspectively transforms the virtual three-dimensional space including the player character P and the non-player characters to be displayed from the virtual camera onto the virtual screen in accordance with setting content of the virtual camera. The control section 11 then executes a display process to generate a two-dimensional image to be displayed on the image display screen 51 (Step S115). When the display process is terminated, this main process is also terminated. Then, when a timer interruption is generated at the start of a next frame period, a next main process is carried out repeatedly. By repeatedly carrying out the main process, a character image is switched every frame period, and a moving image animation) is resultantly displayed on the image display screen 51.

Now, the display process at Step S115 will be simply described. At Step S115, the control section 11 first transforms at least the coordinates of the vertexes of respective polygons included within a range to be perspectively transformed on the virtual screen among the coordinates of the vertexes of polygons constituting the virtual three-dimensional space in which the player character P and the three-dimensional non-player characters are included from the coordinates of the world coordinate system to the coordinates of the viewpoint coordinate system. Subsequently, the control section 11 transmits the coordinates of the vertexes of polygons of the player character P and the non-player characters in the viewpoint coordinate system to the graphics processor 15, thereby outputting a drawing or graphics to the graphics processor 15.

When the drawing or graphics is input to the graphics processor 15, the graphics processor 15 updates, on the basis of the coordinates of the viewpoint coordinate system, the content of the Z buffer so that data on the points that reside at the front side are retained with respect to points constituting each surface. When the content of the Z buffer is updated, the graphics processor 15 develops image data on the points that reside at the front side on the frame memory 19. Moreover, the graphics processor 15 carries out some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals output from the graphics processor 15 on the image display screen 51. By switching images displayed on the image display screen 51 every single frame period, the player can see images including the state in which the player character and/or the non-player characters are moved on the field.

Next, an example of a status of the player character will now be described.

Figures 3, 4:
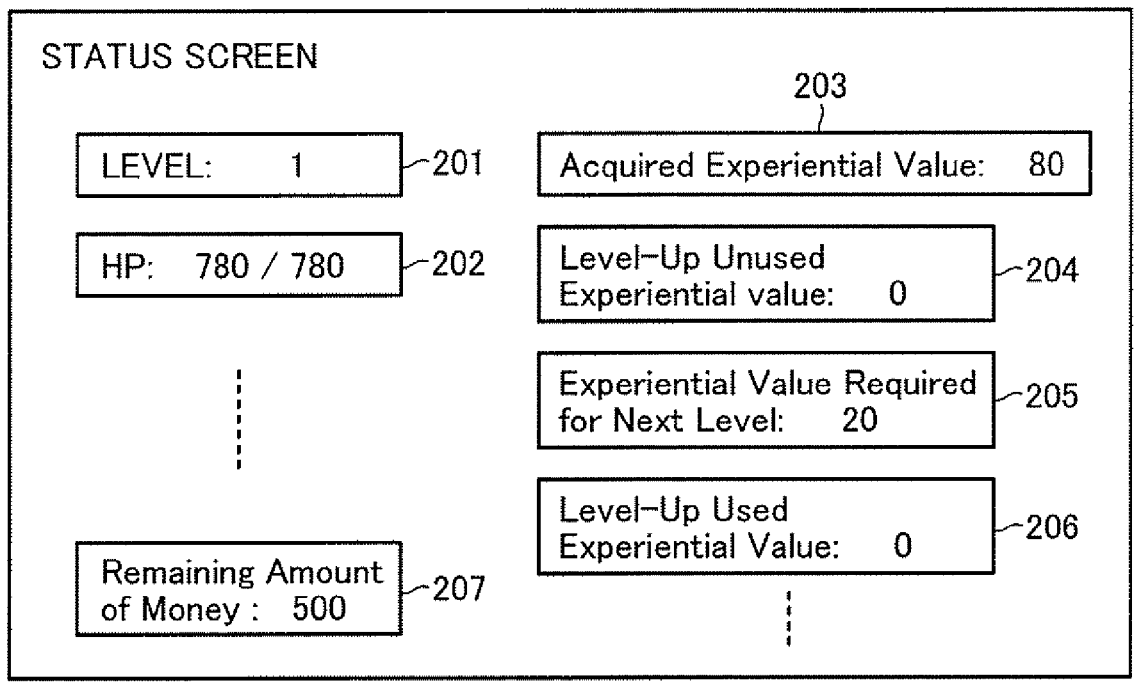
FIG. 3 is an explanatory drawing that shows an example of a status screen.
FIG. 4 is an explanatory drawing that shows an example of NPC basic data.

FIG. 3 is an explanatory drawing that shows an example of a status screen in which a status of the player character is displayed. As shown in FIG. 3, in the status screen, a level display region 201, an HP display region 202, an acquired experiential value display region 203, a level-up unused experiential value display region 204, an experiential value required for a next level display region 205, a level-up used experiential value display region 206, and a remaining amount of money display region 207 are provided. A current level of the player character is displayed in the level display region 21. A maximum value and a current value of a hit point (HP) of the player character are displayed in the HP display region 202. An acquired experiential value is displayed in the acquired experiential value display region 203. A level-up unused experiential value is displayed in the level-up unused experiential value display region 204. An experiential value required for a next level is displayed in the experiential value required for a next level display region 205. A level-up used experiential value that has been used for level up (or upgrade) until the player character reached the current level is displayed in the level-up used experiential value display region 206. A remaining amount of money to be used as money in the video game is displayed in the remaining amount of money display region 207.

The "acquired experiential value" as referred to herein means an experiential value that is not reflected to a regular experiential value of the player character (hereinafter, referred to as a "PC (Player Character) experiential value") within the experiential value that the player character has acquired. In this regard, the "regular experiential value" as referred to herein means an experiential value that has been used for level up of the player character in the video game, and a usable experiential value for level up of the player character in the video game (that is, an experiential value that has already been saved and does not become extinct (disappear) even when the video game is over and the like). When the player character carries out an attack against an enemy character, the HP of the enemy character is lowered. In the case where the HP of the enemy character is lowered to a predetermined action impossible value (which is a value at which the enemy character is considered to be dead in the video game, for example, "0") and the enemy character becomes an action impossible state, in the case where the HP of the enemy character is lowered to a predetermined escape value (which is a value defined in advance for each of enemy characters as a value at which the corresponding enemy character escapes from a battle field, for example, "1,000", "5,000", "10,000" and "20,000") and the enemy character becomes a battle impossible state, or in the case where a battle cannot be continued after the enemy character is damaged by the player character (for example, the case where the enemy character is to be outside a battle field by which the enemy character does escape from the battle field), a value in accordance with the kind of the enemy character and the degree of damage thereof is applied to the player character as an "acquired experiential value".

In the present embodiment, the acquired experiential value is to be reflected to the PC experiential value only when a stage is cleared, or the player selects to reflect the acquired experiential value to the PC experiential value at the time of "continue". Namely, in the present embodiment, even in the case where an experiential value is acquired by the player character, the experiential value is not reflected to a PC experiential value immediately.

The "level-up unused experiential value" as referred to herein means an experiential value that is not used for level up of the player character in the video game yet within the PC experiential value. The "level-up used experiential value" as referred to herein means an experiential value that has already been used for level up of the player character in the video game within the PC experiential value. The "experiential value required for a next level" as referred to herein means a PC experiential value required for upgrade to a next level. In the present embodiment, the total value of a level-up unused experiential value and a level-up used experiential value becomes a value of a PC experiential value. Further, in the present embodiment, when a level-up unused experiential value becomes a value more than an experiential value required for a next level, the level of the player character in the video game becomes the level of a next level (that is, the level is upgraded to a next level) by converting a numerical value indicated by the experiential value required for a next level within a numerical value indicated by the level-up unused experiential value thereto. In this regard, in the present embodiment, the experiential values for a next level are "20" for level up (upgrade) from level "1" to level "2", and "80" for level up (upgrade) from level "2" to level "3", respectively. However, such an experiential value for a next level may be set to any value.

Next, an example of a method of calculating an acquired experiential value will now be described.

In the present embodiment, an experiential value to be acquired by one action against an enemy character is calculated by a formula (a "death experiential values"+a "subtract HP"×a "damage experiential value") of an enemy character. In the present embodiment, as shown in FIG. 4, a character name, a maximum HP, a death experiential value, a damage experiential value and the like of each enemy character are set as NPC basic data. FIG. 4 is an explanatory drawing that shows an example of NPC basic data.

The "death experiential value" as referred to herein is a value that is supplied to the player character as an acquired experiential value only in the case where the enemy character becomes an action impossible state by means of an attack by the player character (that is, when the HP of the enemy character becomes "0"). The "subtract HP" is a value of the HP of an enemy character which is subtracted from the HP of the enemy character by one battle. For this reason, the subtract HP becomes a maximum value when the enemy character becomes an action impossible state. The maximum value of the subtract HP is equal to the value of the "maximum HP".

Further, the "damage experiential value" is a value that is supplied to the player character as an acquired experiential value every one point of a subtract HP of an enemy character by one battle. In this regard, the "damage experiential value" may be a decimal as shown in FIG. 4. Alternatively, the "damage experiential value" may be an integer. In the case where the "damage experiential value" is a decimal, the calculated acquired experiential value may become a decimal. In such a case, a value less than a decimal point may also be stored in, for example, the RAM 12. Then, in the case where a cumulative value of the decimals exceeds one, the acquired experiential value to which the cumulative value is reflected may be displayed on the status screen.

When the player character attacks an enemy character corresponding to a character Q shown in FIG. 4 so that the enemy character Q becomes an action impossible state, the enemy character Q may become a battle impossible state. In this case, an acquired experiential value of the player character becomes "1,616" by calculating the formula ["death experiential value (20)"+"subtract HP (22,800)"×"damage experiential value (0.07)"] of the enemy character Q. Further, an escape value of the character Q that is an enemy character may be defined as a value "HP=20,000". In the case where the enemy character Q becomes a battle impossible state and escapes from a battle field with the player character at the time when the HP of the enemy character Q becomes "20,000", the acquired experiential value of the player character becomes "196" by calculating the formula ["subtract HP (2,800)"×"damage experiential value (0.07)"] of the enemy character Q. Moreover, for example, in the case where the enemy character Q gets out of a battle field (for example, the enemy character Q escapes and then gets out of the battle field, or the player character gets clear away from the enemy character Q, and the enemy character Q thus gets out of the battle field) and a battle state is thus terminated, the acquired experiential value of the player character becomes "98" by calculating the formula ["subtract HP (1,400)"×"damage experiential value (0.07)"] of the enemy character Q.

Further, when the player character attacks an enemy character corresponding to a character R shown in FIG. 4 so that the enemy character R becomes an action impossible state, the enemy character R may become a battle impossible state.

In this case, an acquired experiential value of the player character becomes "460" by calculating the formula ["death experiential value (10)"+"subtract HP (15,000)"×"damage experiential value (0.03)"] of the enemy character R. Moreover, in the case where the enemy character R gets out of a battle field with the player character at the time when the HP of the enemy character R becomes "5,000" and a battle state is thus terminated, the acquired experiential value of the player character becomes "300" by calculating the formula ["subtract HP (10,000)"× "damage experiential value (0.03)"] of the enemy character R.

Furthermore, when the player character attacks an enemy character corresponding to a character S shown in FIG. 4 so that the enemy character S becomes an action impossible state, the enemy character S may become a battle impossible state. In this case, an acquired experiential value of the player character becomes "5" by calculating the formula ["death experiential value (5)"+"subtract HP (500)"×"damage experiential value (0)"] of the enemy character S. Further, in the case where the enemy character S gets out of a battle field with the player character before the HP of the enemy character S becomes "0" and a battle state is thus terminated, the acquired experiential value of the player character becomes "0" because the damage experiential value of the enemy character S is "0". Namely, with respect to the enemy character S of the enemy characters, the player character can acquire an acquired experiential value only in the case where the enemy character Q becomes an action impossible state.

Next, an experiential value adding process in the video game apparatus 100 of the present embodiment will now be described.

Figure 5:
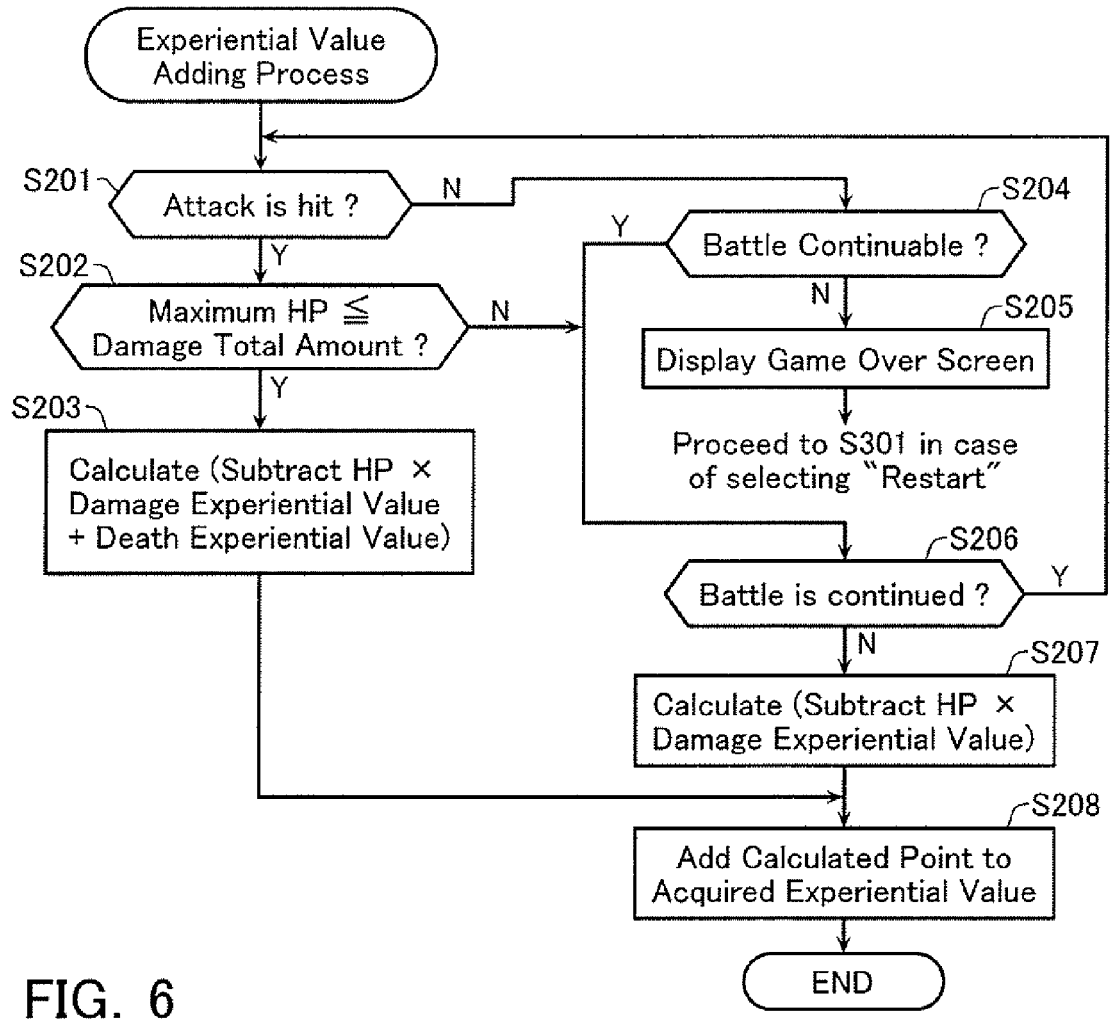
FIG. 5 is a flowchart that illustrates an example of an experiential value adding process.

FIG. 5 is a flowchart that illustrates an example of an experiential value adding process by the video game apparatus 100 in the present embodiment. The experiential value adding process is a process in which processes regarding addition of an acquired experiential value are put into one flowchart. This experiential value adding process is carried out by carrying out the main process described above repeatedly.

Here, the case where an experiential value that a player character P acquires when the player character P battles an enemy character Q is reflected to an acquired experiential value of the player character P will be described as an example.

In the experiential value adding process, the control section 11 first determines whether an attack from the player character P is hit to the enemy character Q or not (Step S201). In the case where the control section 11 determines that the attack is hit ("Yes" at Step S201), the control section 11 determines whether or not a damage total amount that is obtained by summing up values that indicate respective damage applied by all attacks to the enemy character Q in this battle including this attack (that is, "damage total amount"="subtract HP"), becomes the value of the maximum HP of the enemy character Q or more (Step S202). Namely, the control section 11 determines whether or not the remaining HP of the enemy character Q becomes "0".

In the case where the control section 11 determines that the damage total amount becomes the value of the maximum HP of the enemy character Q or more ("Yes" at Step S202), the control section 11 calculates a formula ("death experiential value"+"subtract HP"×"damage experiential value") of the enemy character Q as an acquired experiential value because the enemy character Q becomes an action impossible state (Step S203). Then, the processing flow proceeds to Step S208.

In the case where the control section 11 determines that the damage total amount is less than the value of the maximum HP of the enemy character Q ("No" at Step S202), the processing flow proceeds to Step S206 because the enemy character Q does not become an action impossible state yet.

In the case where the control section 11 determines that the attack from the player character P is not hit to the enemy character Q ("No" at Step S201), the control section 11 determines whether or not the player character P can continue to battle with the enemy character Q (Step S204). Namely, the control section 11 determines whether or not the remaining HP of the player character P is "0".

In the case where the control section 11 determines that the player character P is in a battle non-continuable state (that is, action impossible state: HP=0), the control section 11 causes the display device 50 to display a game-over screen for informing the player that the video game is over (Step S205). In the present embodiment, although it is not illustrated, a select button to select "Restart" of the video game and a select button to select "Return to the title" are provided on the game-over screen. Then, in the case where a selection operation to continue playing the video game on the game-over screen by the player (that is, operation of the keypad 30 to press the select button "Restart") is made, the control section 11 causes the processing flow proceeds to Step S301 of a continue screen operation corresponding process as described later (see FIG. 7).

In the case where the control section 11 determines at Step S204 that the player character P can continue to battle, the control section 11 determines whether or not the battle is continued with the enemy character Q (Step S206). Namely, the control section 11 determines whether or not the enemy character Q still exists on the battle field. The control section 11 determines that the battle is continued in the case where the enemy character Q exists on the battle field. On the other hand, the control section 11 determines that the battle is terminated in the case where the enemy character Q gets out of the battle field (for example, the enemy character Q escapes from the battle field).

In the case where the control section 11 determines that the battle is continued ("Yes" at Step S206), the control section 11 causes the processing flow to proceed to Step S201. On the other hand, in the case where the control section 11 determines that the battle with the enemy character Q is terminated ("No" at Step S206), the control section 11 calculates a formula ("subtract HP"×"damage experiential value") as an acquired experiential value (Step S207).

The control section 11 then adds the value obtained by calculation at Step S203 or Step S207 to the acquired experiential value of the player character P (Step S208).

As described above, in the case where the player character P causes an enemy character to become an action impossible state by means of a battle, or in the case where the player character P applies damage to an enemy character but the enemy character does not become an action impossible state, an experiential value is calculated in accordance with the type of enemy character (more specifically, setting contents in the NPC basic data), and the calculated experiential value is added to the existing acquired experiential value of the player character P.

Figure 6:
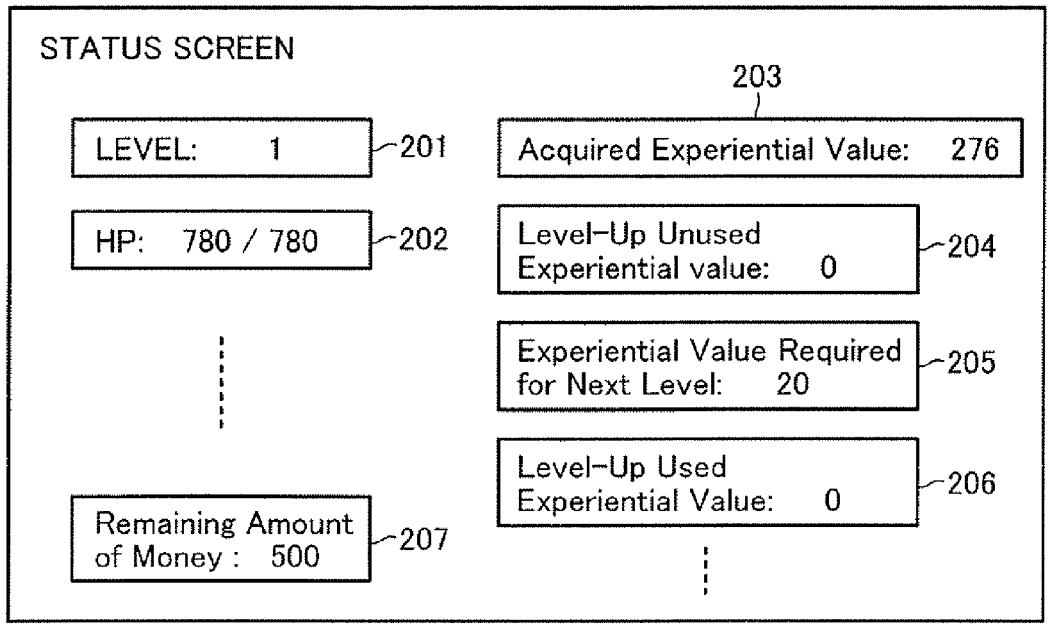
FIG. 6 is an explanatory drawing that illustrates an example of the status screen after updating an acquired experiential value.

More specifically, for example, the player character P battles the enemy character Q when the status of the player character P is in a state as shown in FIG. 3. In the case where a battle state is terminated at the time when the HP of the enemy character Q becomes "20,000" ("No" at Step S206), the value "196" (which is obtained by calculating the formula ["subtract HP (2,800)"×"damage experiential value (0.07)"])

as described above is added to the acquired experiential value (Steps S207 and S208), and the status of the player character P changes to a state as shown in FIG. 6. Namely, the value of the acquired experiential value displayed in the acquired experiential value display region 203 changes from "80" to "276" (which is obtained by adding "196" to "80").

Next, a continue screen operation corresponding process in the video game apparatus 100 of the present embodiment will now be described.

Figure 7:
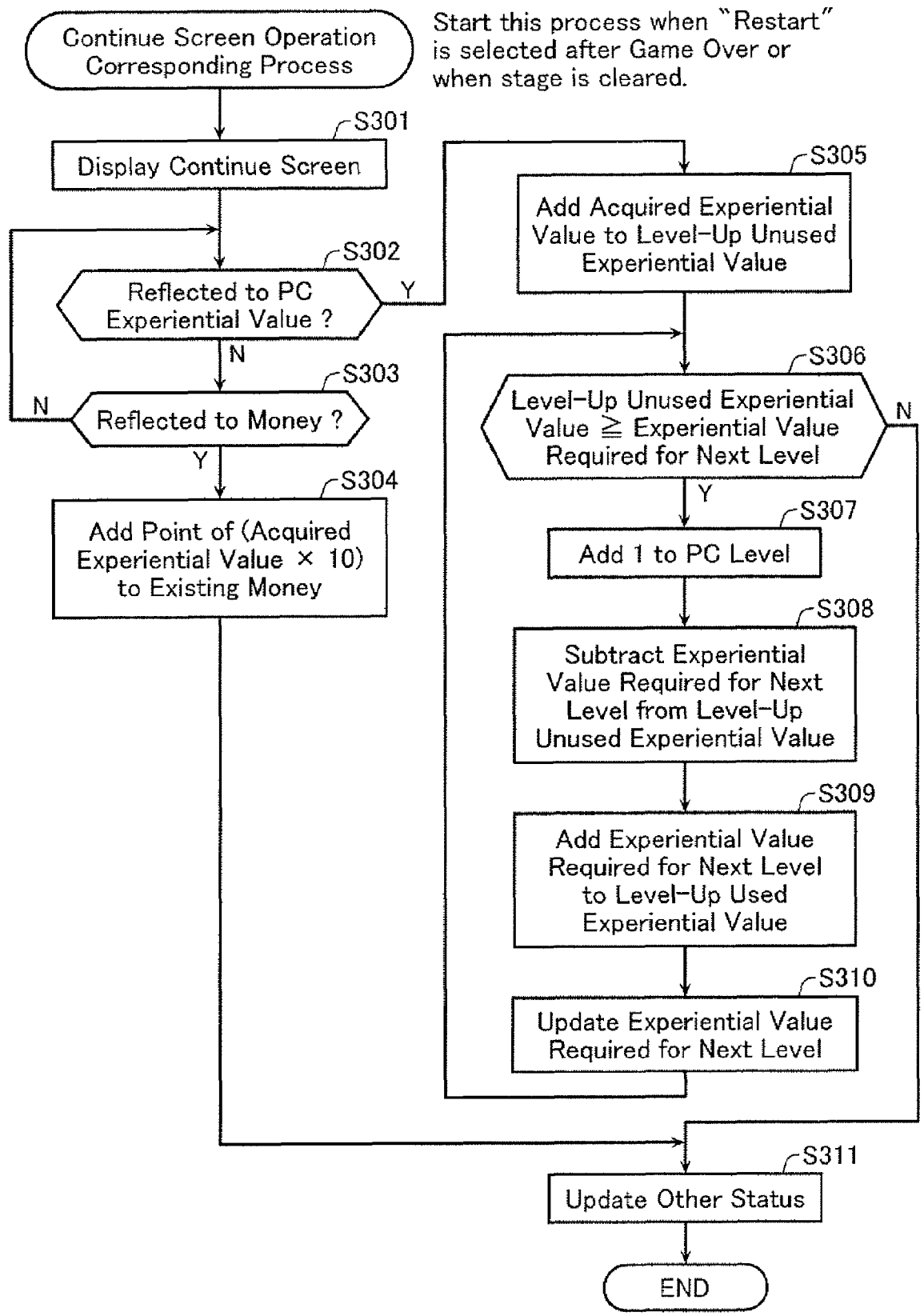
FIG. 7 is a flowchart that illustrates an example of a continue screen operation corresponding process.

FIG. 7 is a flowchart that illustrates an example of a continue screen operation corresponding process by the video game apparatus 100 in the present embodiment. The continue screen operation corresponding process is a process in which processes carried out in accordance with instructions by operations of the player when the continue screen is displayed are put into one flowchart. The continue screen operation corresponding process is carried out by carrying out the main process described above repeatedly.

The continue screen operation corresponding process is carried out when a selection operation of "continue" is made on the game-over screen by the player after the player character P becomes a battle non-continuable state (HP=0) (see "No" at Step S204) or when a stage is cleared in the video game.

Figure 8:
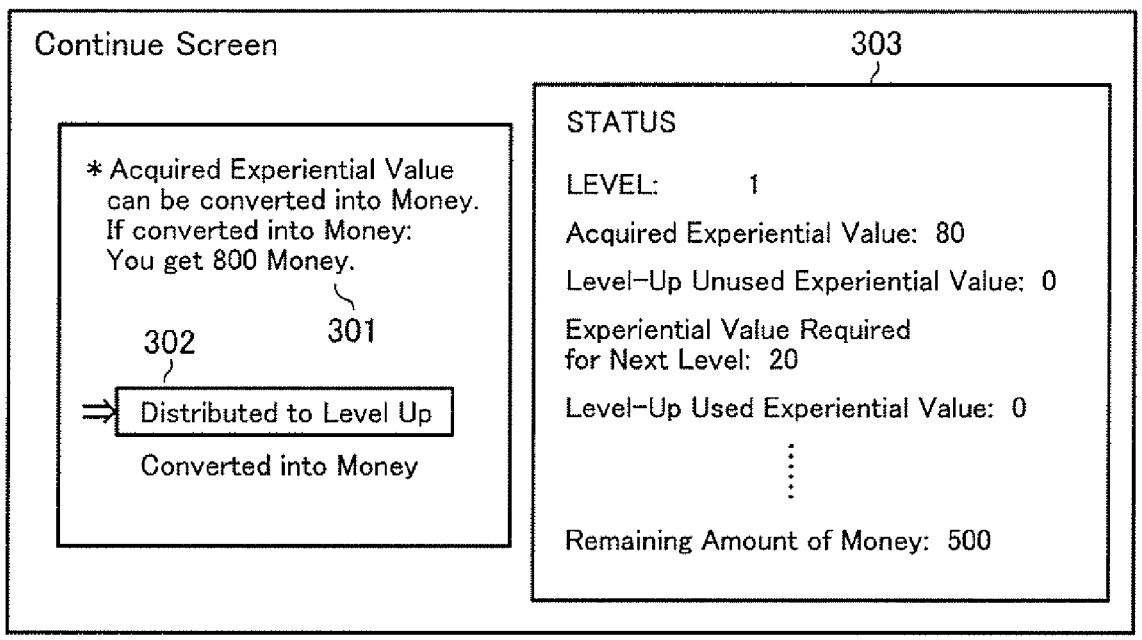
FIG. 8 is an explanatory drawing that illustrates an example of a continue screen.

In the continue screen operation corresponding process, the control section 11 first gives drawing instructions to the graphics processor 15 to cause the display device 50 to display a "continue" screen (Step S301). For example, as shown in FIG. 8, a display region 301 for displaying guidance to the player; a selection operation receiving region 302 for causing the player to select a method of application of the acquired experiential value; and a status display region 303 for displaying a current status of the player character P are provided on the continue screen.

Subsequently, the control section 11 receives a selected result of the method of application of the acquired experiential value in response to the operation of the keypad 30 by the player (Steps S302 and S303). At this time, the player operates the keypad 30 to select either a button "Distributed to level up" or a button "Converted into money" that are displayed in the selection operation receiving region 302.

In the case where the control section 11 determines that the button "Converted into money" is selected ("No" at Step S302 and "Yes" at Step S303), the control section 11 calculates the amount of money (money point) on the basis of the current acquired experiential value, and adds the calculated amount of money to existing money (Step S304). In the present embodiment, the value of 10 times of the acquired experiential value is to be the amount of money. In this regard, a method of calculating the amount of money may be any method so long as the amount of money is calculated on the basis of the acquired experiential value. For example, the amount of money may be calculated as the same as, two times, 100 times, or a half of the acquired experiential value.

In the case where the control section 11 determines that the button "Distributed to level up" is selected ("Yes" at Step S302 and "No" at Step S303), the control section 11 adds the acquired experiential value to a level-up unused experiential value in order to reflect the acquired experiential value to the PC experiential value (Step S305). The control section 11 then determines whether or not the level-up unused experiential value becomes an experiential value required for a next level or more (Step S306).

In the case where the control section 11 determines that the level-up unused experiential value becomes the experiential value required for a next level or more ("Yes" at Step S306), the control section 11 increments (or adds one to) the level of the player character P (Step S307), subtracts the experiential value required for a next level from the level-up unused experiential value (Step S308), and adds the experiential value required for a next level to a level-up used experiential value (Step S309). The control section 11 then updates the experiential value required for a next level to a new experiential value required for a next level that indicates a PC experiential value required for level up from the level made up at Step S307 (Step S310), and the processing flow proceeds to Step S306.

In the case where the level-up unused experiential value after the subtract at Step S308 is the new experiential value required for a next level or more, the processes at Steps S307 to S310 are carried out again. Then, the processes at Steps S307 to S310 are carried out repeatedly until the level-up unused experiential value becomes less than a subsequent experiential value required for a next level.

In the case where the control section 11 determines that the level-up unused experiential value is less than the current or new experiential value required for a next level (which is stored in the RAM 12 or the like) ("No" at Step S306), the control section 11 updates the other status (Step S311), and the continue screen operation corresponding process is terminated.

In this regard, in the case where the continue screen operation corresponding process is carried out in response to the request for restart after the video game is over, the video game is caused to start from the scene that has been saved previously at a state where the update of the status by the continue screen operation corresponding process is reflected after the continue screen operation corresponding process is terminated as described above. On the other hand, in the case where the continue screen operation corresponding process is carried out when the current stage is cleared, the video game is caused to start from a scene of a next stage at a state where the update of the status by the continue screen operation corresponding process is reflected after the continue screen operation corresponding process is terminated as described above.

As described above, the acquired experiential value is reflected to either the PC experiential value or money in accordance with the desire of the player in the continue screen operation corresponding process.

More specifically, for example, in the case where the player selects to reflect the acquired experiential value to the PC experiential value when the status of the player is in a state shown in FIG. 3 (see "Yes" at Step S302), the control section 11 adds "80" that is the acquired experiential value to the level-up unused experiential value, whereby the level-up unused experiential value becomes "80" (see Step S305). In the case where the control section 11 then determines that the level-up unused experiential value (that is, "80") is "20" (which is the experiential value required for a next level) or more (see "Yes" at Step S306), the control section 11 increments the level of the player character (PC level) so that the PC level becomes "2" (see Step S307); subtracts the experiential value required for a next level from the level-up unused experiential value so that the level-up unused experiential value becomes "60" (see Step S308); adds the experiential value required for a next level to the level-up used experiential value (see Step S309); and updates the experiential value for a next level to "80" that is a value required for level up from level 2 to level 3 (see Step S310). Since "60" that is the level-up unused experiential value is not more than "80" that is the new experiential value required for a next level (see "No" at Step S306), the control section 11 updates the other status (see Step S311), and the processing flow is terminated.

Figure 9:
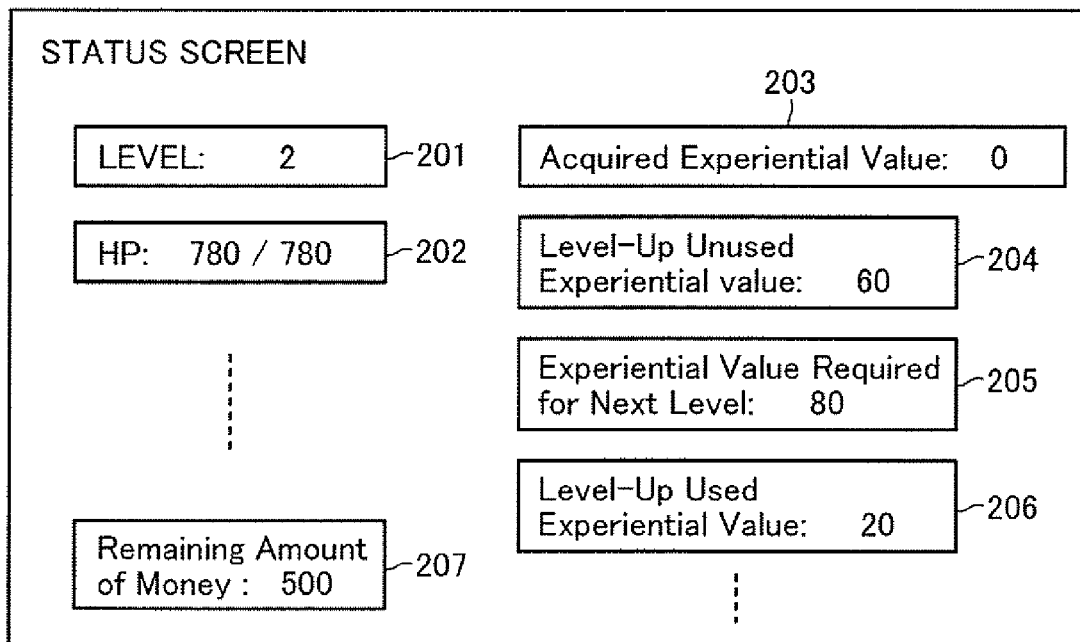
FIG. 9 is an explanatory drawing that illustrates an example of the status screen after reflecting the experiential value to a PC experiential value.

The status screen on which the status after updated as described above is displayed becomes a state as shown in FIG. 9, for example.

Figure 10:
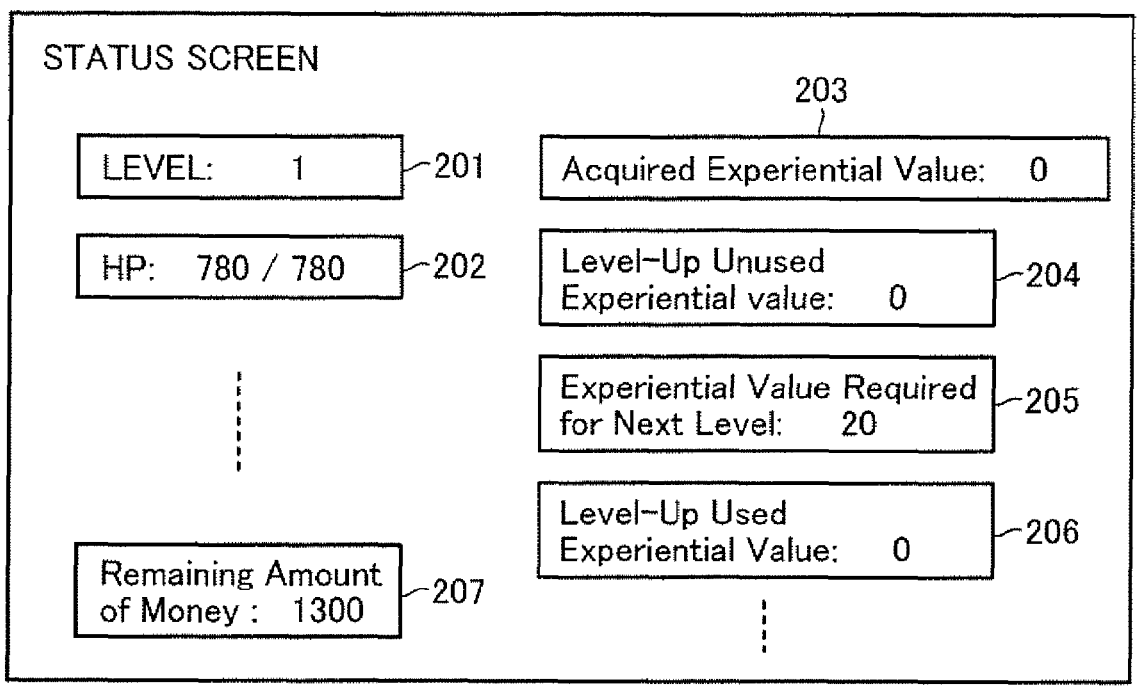
FIG. 10 is an explanatory drawing that illustrates an example of the status screen after reflecting the experiential value to a money point.

Further, for example, in the case where the player selects to reflect the acquired experiential value to money when the status of the player is in a state shown in FIG. 3 (see "Yes" at Step S303), the control section 11 calculates "80"×ten to obtain "800" as an amount of money, and adds the calculated amount of money (that is, "800") to the amount of existing money (that is, "500"), whereby the amount of existing money becomes "1,300" (see Step S304). Moreover, the control section 11 initializes the acquired experiential value (that is, "80") to be "0". The control section 11 then updates the other status (see Step S311), and the processing flow is terminated. The status screen on which the status after updated as described above is displayed becomes a state as shown in FIG. 10, for example.

As described above, the video game apparatus 100 is constructed so that the acquired experiential value is reflected to either the PC experiential value or money in accordance with the desire of the player in the continue screen operation corresponding process. Thus, the user can select whether the experiential value that has been acquired from the nearest save point to the time when the video game is over is reflected to either the PC experiential value or the money when the video game is to be continued after the video game is over on the basis of level of skill and/or liking (desire) of the player. For example, a player skilled in the video game may refuse to reflect the experiential value to the PC experiential value, by which it is possible to avoid deteriorating the degree of difficulty in the video game due to improvement of the experiential value. On the other hand, a player who does not have much experience may select to reflect the experiential value to the PC experiential value, by which such a player can avoid having no other choice than to carry out playing the video game from the same scene in the video game under same conditions repeatedly. Thus, such a player can improve the experiential value and cause the video game to proceed smoothly.

As explained above, in the embodiment described above, when a predetermined save execution condition is met (for example, when there is a save instruction from the player at a save point, when a current stage is cleared, and when there is a save instruction from the player at the time of "continue", the control section 11 updates the game progress state information stored in the memory card 90 to allow the player to resume (or restart) playing the video game from the current progress state of the video game indicated by the game progress state information. Further, the control section 11 determines an experiential value that the player character is caused to acquire in the case where a predetermined condition to acquire the experiential value is met (for example, the case where the enemy character becomes a battle impossible state, and the case where the enemy character does not become a battle impossible state, but a battle state is terminated after the HP of the enemy character is made to be reduced). Moreover, the control section 11 stores the experiential value thus determined in the memory card 90. Furthermore, the control section 11 determines whether or not the video game is to be continued in response to an instruction from the player when the player character becomes a battle impossible state. Further, the control section 11 receives from the player whether or not the experiential value thus stored is to be reflected to a level of the player character in the video game in the case where it is determined to continue playing the video game. Moreover, the control section 11 reflects the experiential value thus stored to the level of the player character in the video game in the case where the control section 11 receives the instruction that the experiential value is to be reflected to the level of the player character in the video game. Furthermore, the control section 11 maintains the level of the player character in the video game, to which the experiential value thus stored has been reflected when the control section 11 receives the instruction that the experiential value is to be reflected to the level of the player character in the video game after the control section 11 determined to continue playing the video game. Then, the control section 11 causes the video game to proceed to a scene thus saved (nearest save point), and to start from the scene. Since the video game processing apparatus of the present invention is constructed as described above, it is possible to reflect the experiential value that the player character has acquired from the nearest save point to the time when the video game is over in accordance with the desire of the player at the time of "continue". It is also possible to improve player's motivation and desire to continue playing the video game regardless of level of skill of the player. Namely, it is possible to reflect the experiential value that the player character has acquired from the nearest save point to the time when the video game is over to the level of the player character in the video game to resume (restart) the video game in order not to return the ability of the player character to the ability at the nearest save point at the time of "continue" after the video game is over only in the case where there is an instruction from the player at the time of "continue". Thus, the player can avoid the state where a stage cannot be cleared no matter how many times the player plays and the start scene is returned to the nearest save point under the same conditions, and this makes it possible to prevent interest in the video game of, for example, a player who does not have much experience from being lowered. Further, it is also possible to return the ability of the player character to the ability at the nearest save point at the time of "continue" after the video game is over only in the case where there is an instruction from the player at the time of "continue", and this makes it possible to prevent the clear of the stage from being facilitated at the time of "resume (restart)" by means of simple increase of offensive power due to level up of the player character. Therefore, for example, it is possible to prevent interest in the video game of a player who wants to clear a stage by trying various kinds of strategy while keeping the level of the player character at the level in the nearest save point from being lowered.

Further, in the embodiment described above, the experiential value to be acquired by the player character when the player character causes the enemy character to become a battle impossible state or the like is stored as the acquired experiential value, and the acquired experiential value thus stored is reflected to the PC experiential value even at the time of "continue" and at the time when the video game is cleared. Thus, it is possible to reflect the experiential value that has been acquired from the nearest save point (that is, acquired experiential value) to the regular experiential value (PC experiential value) to be used for level up of the player character in the video game or the like even at the time of "save" and at the time when the stage is cleared.

Moreover, in the embodiment described above, the video game processing apparatus is constructed so that the acquired experiential value thus stored is reflected to the money point that is a parameter other than the PC experiential value (which is a point to be used as money in the video game) in response to the instruction from the player. Thus, it is possible to reflect the acquired experiential value to the money point that is a parameter other than the experiential value in response to the instruction from the player. Namely, the clear of the current stage at the time of "resume" is not just facilitated by means of simple increase of offensive power due to level up of the player character, and it is possible to convert and reflect the experiential value to the money point in response to the instruction from a player who wants to clear a stage by trying various kinds of strategy while keeping the level of the player character at the level in the nearest save point.

Furthermore, in the embodiment described above, the video game processing apparatus is constructed so that the conditions to acquire an experiential value are met in the case where the enemy character becomes a battle impossible state by lowering the life point (that is, HP) thereof by means of attack from the player character, and the case where the enemy character does not become a battle impossible state but a battle state against the enemy character is terminated after the life point (HP) of the enemy character is lowered by means of the attack from the player character in addition to the case where the enemy character is caused to become an action impossible state. Thus, even in the case where the player character cannot cause the enemy character to become an action impossible state completely, the player character can acquire the experiential value so long as the HP of the enemy character is lowered by means of the attack from the player character. In this regard, in the case where the player character acquires the experiential value by lowering the HP of the enemy character, the acquired experiential value is to be defined on the basis of the degree of lowered. Thus, the player character can acquire an appropriate experiential value in accordance with the state of the enemy character (that is, a damage state thereof) when the life point (HP) of the enemy character is lowered to the escape value, or when the battle state against the enemy character whose escape value is not set (or whose life point is not lowered to the escape value yet) is terminated. Further, a method of calculating an experiential value when the battle state is terminated before the enemy character becomes an action impossible state after the life point (HP) of the enemy character is lowered by means of the attack from the player character is not limited to the method as described above, and it may be any other method.

In this regard, the conditions to acquire the experiential value may also be met when the battle state is terminated because the player character becomes an action impossible state before the enemy character becomes an action impossible state after the life point (HP) of the enemy character is lowered by means of the attack from the player character. In this case, for example, the experiential value may be calculated in the same manner as that when the battle state is terminated before the enemy character becomes an action impossible state after the life point (HP) of the enemy character is caused to be lowered by means of the attack as described above. By constituting the video game processing apparatus in this manner, it is possible to acquire the experiential value even in the case where the player character loses the battle when the player character battles an enemy character having high life force such as a boss character, for example. This makes it possible to reflect the experiential value to the level of the player character in the video game at the time of "continue".

In this regard, in the embodiment described above, although the acquired experiential value is reflected to either the PC experiential value or money in accordance with the desire of the player in the continue screen operation corresponding process, for example, the acquired experiential value may be reflected to any parameter other than the PC experiential value and money such as a magic point and a combat capability value, for example.

Further, in the embodiment described above, although the acquired experiential value is reflected to either the PC experiential value or money in accordance with the desire of the player in the continue screen operation corresponding process, the player may be caused to select whether or not the acquired experiential value is reflected to the PC experiential value to restart the video game, by which the acquired experiential value may be reflected to the PC experiential value or be made invalid in accordance with the desire of the player.

Moreover, in the embodiment described above, although the acquired experiential value is reflected to either the PC experiential value or money in accordance with the desire of the player in the continue screen operation corresponding process, a part of the acquired experiential value may be reflected to the PC experiential value and the other part of the acquired experiential value may be reflected to money in accordance with the desire of the player. By constructing the video game processing apparatus in this manner, it is possible to reflect the acquired experiential value to the level of the player character in the video game by the amount desired by the player, and this makes it possible to accept various levels of skill of players.

Furthermore, in the embodiment described above, although the acquired experiential value is reflected to the PC experiential value at the time of "save", "continue" and/or "stage clear", the acquired experiential value may be reflected to the PC experiential value immediately when the player character acquires the acquired experiential value. In this case, the player may be caused to select at the time of "continue" whether to return the level of the player character in the video game at the nearest save point or to maintain the level of the player character in the video game to which the acquired experiential value has already been reflected, by which the level of the player character may be determined whether to be returned or to be maintained in accordance with the instruction from the player. By constructing the video game processing apparatus in this manner, it is possible to maintain the level of the player character in the video game to which the experiential value that has been acquired from the nearest save point to the time when the video game is over is reflected at the time of "continue" in accordance with the desire of the player. This makes it possible to improve player's motivation and desire to continue playing the video game regardless of level of skill of the player.

Further, although it has not been referred particularly in the embodiment described above, the acquired experiential value may be reflected to the level of the player character in the video game so long as the acquired experiential value thus stored is a predetermined reference value (for example, 10, 100 or 11000) or more. More specifically, so long as the acquired experiential value thus stored is the predetermined reference value or more at the time of "continue", the video game processing apparatus may be constructed to receive the instruction from the player whether or not the acquired experiential value is reflected to the level of the player character in the video game. By constructing the video game processing apparatus in this manner, it is possible to reflect the acquired experiential value to the level of the player character so long as the experiential value that has been acquired from the nearest save point to the time when the video game is over is the predetermined reference value or more. This makes it possible to prevent the acquired experiential value from being reflected to the level of the player character in the video game extremely easily.

In this regard, in the case where the acquired experiential value can be reflected to the PC experiential value so long as the acquired experiential value is the predetermined reference value or more, for example, the control section 11 may determine the reference value to be used to determine whether or not the acquired experiential value is reflected to the experiential value of the player character on the basis of at least one of the setting contents of the degree of difficulty in the video game and the type of current stage in the video game. By constructing the video game processing apparatus in this manner, it is possible to change the reference value on the basis of the setting contents of the degree of difficulty in the video game and/or the type of a stage in the video game.

Further, in the embodiment described above, the experiential value that has already been saved within the experiential value that is not used for level up is referred to as the "level-up unused experiential value", while the experiential value that has not been saved is referred to as the "acquired experiential value". The two values are distinguished in this manner. However, the value to add the "acquired experiential value" and the "level-up unused experiential value", that is, the total of the experiential value that is not used for level up may be displayed on the status screen as a "level-up unused total experiential value" without distinguishing the two values to the eyes. In this case, whenever the player character acquires an experiential value, the experiential value may be added to the "level-up unused total experiential value". By constructing the video game processing apparatus in this manner, the process at Step S305 in the continue screen operation corresponding process (see FIG. 7) is not required, and a part or the whole of the level-up unused total experiential value is used for level up as it is Moreover, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the invention.

Furthermore, although the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the invention.

Further, although it has been explained with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the invention.

Moreover, in the embodiment described above, although it has been described that game data for causing the video game apparatus main body 10 (video game apparatus 100) to carry out various processes described above (that is, various data such as control program data used for the video game) are stored in the storage medium 70, the video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the above example, such data may include at least control program data for causing a computer to carry out the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image display apparatus to display a player character of a video game on an image screen of the image display apparatus, the video game processing apparatus controlling progress of the video game by controlling an action of the player character displayed on the image screen in accordance with operations by a player, the video game processing apparatus comprising:

a game progress state information memory that stores game progress state information that indicates a progress state of the video game;

a game progress state information update processor that, when a predetermined save execution condition is met, updates the game progress state information stored in the game progress state information memory to allow the player to resume playing the video game from the progress state of the video game indicated by the game progress state information;

an acquired experiential value determiner that determines an experiential value that the player character is caused to acquire when a predetermined condition to acquire the experiential value is met;

an experiential value memory that stores the experiential value determined by the acquired experiential value determiner;

a game continuation determiner that, when the player character attains a battle impossible state, determines whether the video game is to be continued in response to an instruction from the player;

an experiential value reflection receiver that receives from the player whether the experiential value stored in the experiential value memory is to be reflected to a level of the player character in the video game when the game continuation determiner determines to continue playing the video game;

an experiential value reflector that reflects the experiential value stored in the experiential value memory to the level of the player character in the video game when the experiential value reflection receiver receives the instruction that the experiential value is to be reflected to the level of the player character in the video game;

an experiential value parameter reflector that converts and reflects the experiential value stored in the experiential value memory to a money point that is to be used as money in the video name when the experiential value reflection receiver receives the instruction that the experiential value is not to be reflected to the level of the player character in the video game; and a game continuation processor that, when the experiential value reflection receiver receives the instruction that the experiential value is to be reflected to the level of the player character in the video game after the game continuation determiner determines to continue playing the video game, maintains the level of the player character in the video game, to which the experiential value stored in the experiential value memory has been reflected by the experiential value reflector, and, when the experiential value reflection receiver receives the instruction that the experiential value is not to be reflected to the level of the player character in the video game after the game continuation determiner determines to continue playing the video game, maintains parameters other than the level of the player character in the video game, to which the experiential value stored in the experiential value memory has been reflected by the experiential value parameter reflector, and causes the video game to proceed to a scene indicated by the game progress state information stored in the game progress state information memory.

2. The video game processing apparatus according to claim 1, wherein the experiential value reflector reflects the experiential value stored in the experiential value memory to the level of the player character in the video game before the game progress state information is updated after the predetermined save execution condition is met, or when a stage in the video game is cleared.

3. The video game processing apparatus according to claim 1, wherein the experiential value reflector reflects the experiential value stored in the experiential value memory to the level of the player character in the video game only when the experiential value is a predetermined reference value or more.

4. The video game processing apparatus according to claim 3, further comprising:

a reference value determiner that determines the predetermined reference value used to determine whether the experiential value stored in the experiential value memory is to be reflected to the level of the player character in the video game in accordance with at least one of setting contents of the degree of difficulty in the video game and the type of a stage in the video game.

5. The video game processing apparatus according to claim 1, wherein the predetermined condition to acquire the experiential value is met when a life point of an enemy character is lowered to a predetermined battle impossible value and the enemy character becomes a battle impossible state or when a battle state with an enemy character whose life point is lowered is terminated due to a predetermined condition such as escape of the enemy character.

6. The video game processing apparatus according to claim 5, wherein the predetermined battle impossible value includes: an action impossible value that is set as a value at which the enemy character becomes an action impossible state; and an escape value that is set as a value at which the enemy character starts to escape.

7. A method of processing a video game by causing an image display apparatus to display a player character of a video game on an image screen of the image display apparatus, the method controlling progress of the video game by controlling an action of the player character displayed on the image screen in accordance with operations by a player, the method comprising:

updating game progress state information that indicates a progress state of the video game and is stored in a game progress state information memory to allow the player to resume playing the video game from the progress state of the video game indicated by the game progress state information, when a predetermined save execution condition is met;

determining an experiential value that the player character is caused to acquire when a predetermined condition to acquire the experiential value is met;

storing the experiential value thus determined in an experiential value memory;

determining whether the video game is to be continued in response to an instruction from the player, when the player character becomes a battle impossible state;

receiving, from the player, whether the experiential value stored in the experiential value memory is to be reflected to a level of the player character in the video game when it is determined to continue playing the video game;

reflecting the experiential value stored in the experiential value memory to the level of the player character in the video game when the instruction that the experiential value is to be reflected to the level of the player character in the video game is received;

converting and reflecting the experiential value stored in the experiential value memory to a money point that is to be used as money in the video name when the instruction that the experiential value is not to be reflected to the level of the player character in the video game is received; and when the instruction that the experiential value is to be reflected to the level of the player character in the video game is received after it was determined to continue playing the video game, maintaining the level of the player character in the video game, to which the experiential value stored in the experiential value memory has been reflected, when the instruction that the experiential value is not to be reflected to the level of the player character in the video game is received after it was determined to continue playing the video game, maintaining parameters other than the level of the player character in the video game, to which the experiential value stored in the experiential value memory has been reflected, and causing the video game to proceed to a scene indicated by the game progress state information stored in the game progress state information memory.

8. A computer readable storage medium on which a program that processes a video game is recorded, progress of the video game being controlled by causing an image display apparatus to display a player character of the video game on an image screen of the image display apparatus, and controlling an action of the player character displayed on the image screen in accordance with operations by a player, the program causing a computer to execute:

updating game progress state information that indicates a progress state of the video game and is stored in a game progress state information memory to allow the player to resume playing the video game from the progress state of the video game indicated by the game progress state information, when a predetermined save execution condition is met;

determining an experiential value that the player character is caused to acquire when a predetermined condition to acquire the experiential value is met;

storing the experiential value thus determined in an experiential value memory;

determining whether the video game is to be continued in response to an instruction from the player, when the player character becomes a battle impossible state;

receiving from the player, whether the experiential value stored in the experiential value memory is to be reflected to a level of the player character in the video game, when it is determined to continue playing the video game;

reflecting the experiential value stored in the experiential value memory to the level of the player character in the video game when the instruction that the experiential value is to be reflected to the level of the player character in the video game is received;

converting and reflecting the experiential value stored in the experiential value memory to a money point that is to be used as money in the video name when the instruction that the experiential value is not to be reflected to the level of the player character in the video game is received; and when the instruction that the experiential value is to be reflected to the level of the player character in the video game is received after it was determined to continue playing the video game, maintaining the level of the player character in the video game, to which the experiential value stored in the experiential value memory has been reflected, and when the instruction that the experiential value is not to be reflected to the level of the player character in the video game is received after it was determined to continue playing the video game, maintaining parameters other than the level of the player character in the video game, to which the experiential value stored in the experiential value memory has been reflected, and causing the video game to proceed to a scene indicated by the game progress state information stored in the game progress state information memory.

* * * * *